(12) United States Patent
Chang

(10) Patent No.: US 12,409,911 B2
(45) Date of Patent: Sep. 9, 2025

(54) BICYCLE OPERATING DEVICE

(71) Applicant: AD-II Engineering Inc., Taichung (TW)

(72) Inventor: Chung-Ren Chang, Taichung (TW)

(73) Assignee: AD-II ENGINEERING INC., Taichung (TW)

( * ) Notice: Subject to any disclaimer, the term of this patent is extended or adjusted under 35 U.S.C. 154(b) by 897 days.

(21) Appl. No.: 17/587,758

(22) Filed: Jan. 28, 2022

(65) Prior Publication Data

US 2023/0242215 A1     Aug. 3, 2023

(51) Int. Cl.
*B62M 25/02*     (2006.01)

(52) U.S. Cl.
CPC .................................. *B62M 25/02* (2013.01)

(58) Field of Classification Search
CPC ......... B62M 25/02; B62K 23/02; B62K 23/06
See application file for complete search history.

(56) References Cited

U.S. PATENT DOCUMENTS

| | | | |
|---|---|---|---|
| 7,665,384 B2 * | 2/2010 | Sato ....................... | B62M 25/04 |
| | | | 74/489 |
| 2007/0245847 A1 * | 10/2007 | Chen ...................... | B62M 25/04 |
| | | | 74/502.2 |
| 2011/0079103 A1 * | 4/2011 | Kususe ................... | B62M 25/04 |
| | | | 74/502.2 |

FOREIGN PATENT DOCUMENTS

| | | | |
|---|---|---|---|
| EP | 1997723 A1 * | 12/2008 | ............. B62K 23/06 |
| TW | I260295 | 8/2006 | |
| TW | I391292 B1 | 4/2013 | |
| TW | I699305 B | 7/2020 | |

* cited by examiner

*Primary Examiner* — Jacob D Knutson
(74) *Attorney, Agent, or Firm* — Muncy, Geissler, Olds & Lowe, P.C.

(57) ABSTRACT

A bicycle operating device includes a housing, a derailleur structure, a brake lever, a first operation assembly and a second operation assembly. The derailleur structure is disposed on the housing and includes a wire reel and a mandrel. The brake lever is rotatably disposed on the housing. The first operating assembly is disposed on the housing and is reversibly rotatable relative to the housing to drive the wire reel to rotate and pull a shift cable. The first operating assembly has a first actuating surface disposed thereon. The second operating assembly has a second actuating surface disposed thereon.

10 Claims, 15 Drawing Sheets

BICYCLE OPERATING DEVICE

BACKGROUND OF THE INVENTION

Field of the Invention

The present invention relates to a bicycle operating device.

Description of the Prior Art

A derailleur device for a bicycle is used to make a chain to switch to different gears in different dimensions on a gear set so as to shift gear and meet various requirements. The derailleur device is assembled to a handlebar of the bicycle. However, the conventional derailleur device has following disadvantages. TWI391292 discloses a derailleur device which is actuated to shift gear by swinging a brake lever in a direction lateral to a travel direction of the bicycle, which is easy to unexpectedly shift gear during braking or unexpectedly brake during shifting gear. TWI260295 discloses a derailleur device which is actuated to shift gear by pressing a button disposed on a side of a handle of the bicycle lateral to the travel direction of the bicycle, which may be dangerous since the user cannot stably grip the handle during pressing the button. TWI699305 discloses a derailleur device which is actuated to shift gear by swinging a control lever, which is easy to misoperate and results in unexpected upshifting or downshifting.

The present invention is, therefore, arisen to obviate or at least mitigate the above-mentioned disadvantages.

SUMMARY OF THE INVENTION

The main object of the present invention is to provide a bicycle operating device, which prevents a shift cable from being interfered with a brake cable so as to accurately shift gear and brake. In addition, the bicycle operating device includes a first operation assembly and a second operation assembly which can be actuated individually so as to accurately upshift or downshift.

To achieve the above and other objects, the present invention provides a bicycle operating device, including: a housing, a derailleur structure, a brake lever, a first operation assembly and a second operation assembly. The housing is configured to be assembled to a handlebar of a bicycle. The derailleur structure is disposed on the housing and includes a wire reel and a mandrel. The wire reel is disposed on the mandrel, and the wire reel is configured for a shift cable to be wound thereon. An axial direction of the mandrel defines a first rotational axis, and the wire reel is reversibly rotatable about the first rotational axis. The brake lever is rotatably disposed on the housing, and the brake lever is swingable about a second rotational axis. A plane vertical to the second rotational axis and passing through a center point of the wire reel is defined as a reference plane. The first operation assembly is disposed on the housing and reversibly rotatable relative to the housing to drive the wire reel to rotate and pull the shift cable. The first operation assembly has a first actuating surface disposed thereon. The second operation assembly is disposed on the housing and reversibly rotatable relative to the housing to drive the wire reel to rotate reversely and release the shift cable. The second operation assembly has a second actuating surface disposed thereon. When the first operation assembly is actuated, the first actuating surface is moved toward the reference plane. When the second operation assembly is actuated, the second actuating surface is moved toward the reference plane. When the first actuating surface is moved toward the reference plane, the second actuating surface is not moved with the first actuating surface. The second actuating surface is located between the second rotational axis and the first actuating surface.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
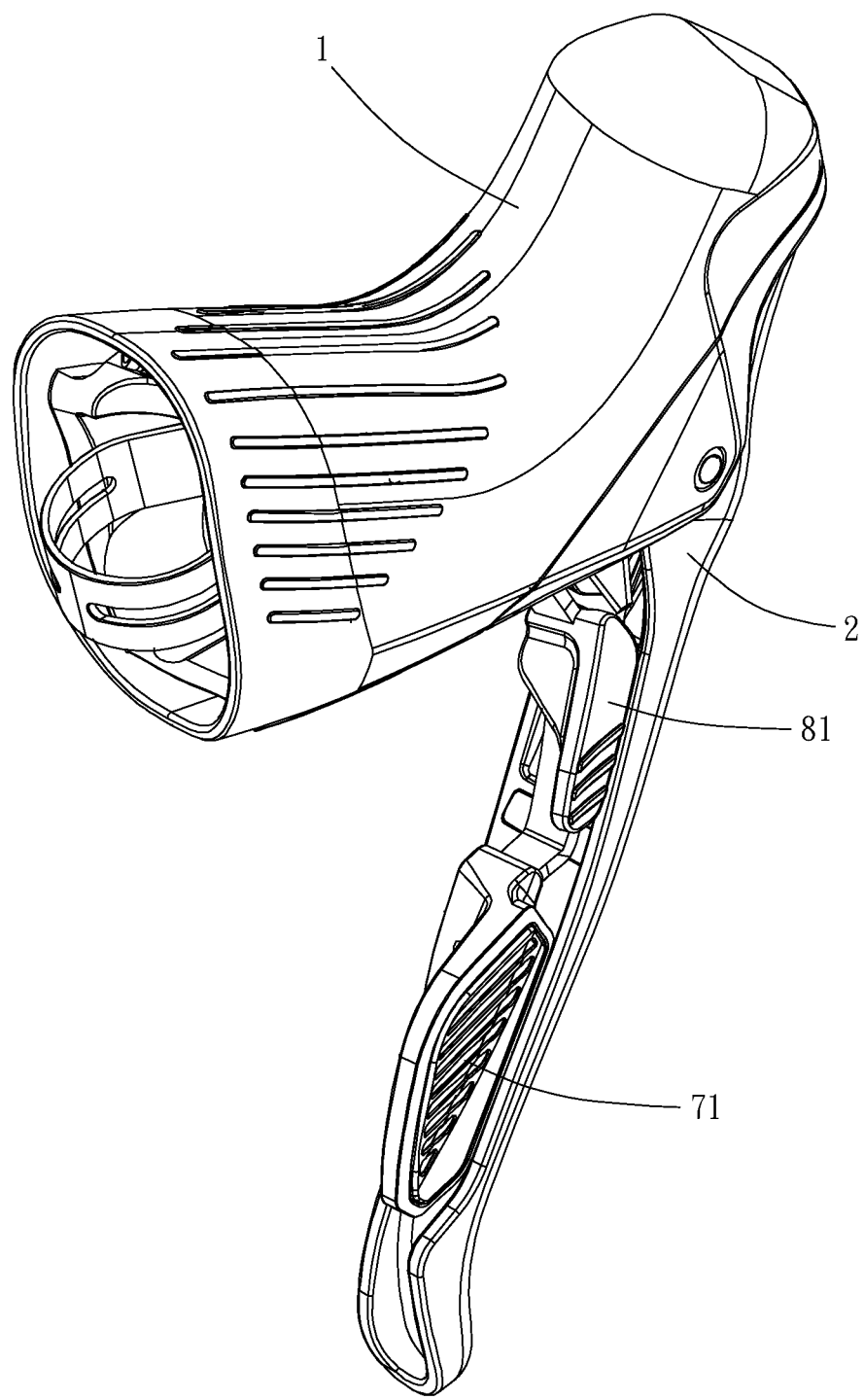
FIG. 1 is a stereogram of a preferable embodiment of the present invention.

Please refer to FIGS. 1 to 16 for a preferable embodiment of the present invention. A bicycle operating device of the present invention includes a housing 1, a derailleur structure 3, a brake lever 2, a first operation assembly 7 and a second operation assembly 8.

The housing 1 is configured to be assembled to a handlebar of a bicycle.

The derailleur structure 3 is disposed on the housing 1 and includes a wire reel 6 and a mandrel 31. The wire reel 6 is disposed on the mandrel 31, and the wire reel 6 is configured for a shift cable 61 to be wound thereon. An axial direction of the mandrel 31 defines a first rotational axis A1, and the wire reel 6 is reversibly rotatable about the first rotational axis A1. In this embodiment, the wire reel 6 is co-movably sleeved with the mandrel 31.

The brake lever 2 is rotatably disposed on the housing 1, and the brake lever 2 is swingable about a second rotational axis A2. A plane vertical to the second rotational axis A2 and passing through a center point of the wire reel 6 is defined as a reference plane A3.

The first operation assembly 7 is disposed on the housing 1 and is reversibly rotatable relative to the housing 1 to drive the wire reel 6 to rotate and pull the shift cable 61. The first operation assembly 7 has a first actuating surface 73 disposed thereon.

The second operation assembly 8 is disposed on the housing 1 and is reversibly rotatable relative to the housing 1 to drive the wire reel 6 to rotate reversely and release the shift cable 61. The second operation assembly 8 has a second actuating surface 84 disposed thereon.

Figure 7:
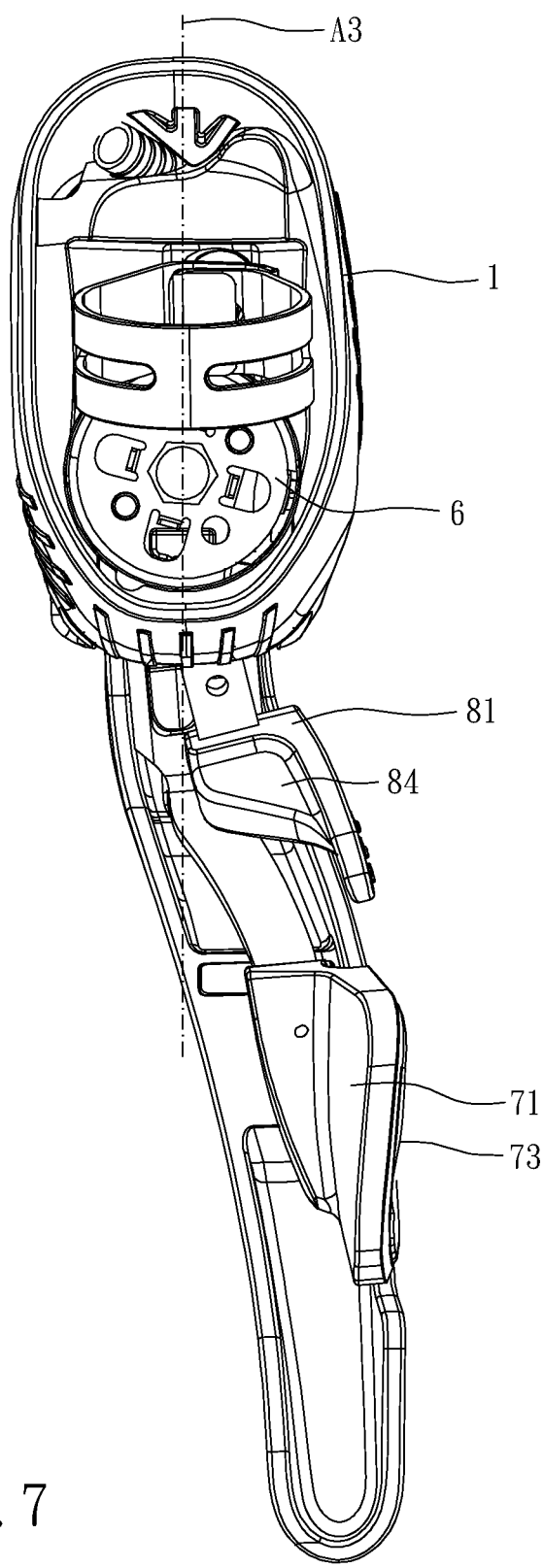
FIGS. 7-9 are drawings showing operation of a preferable embodiment of the present invention.
Figure 8:
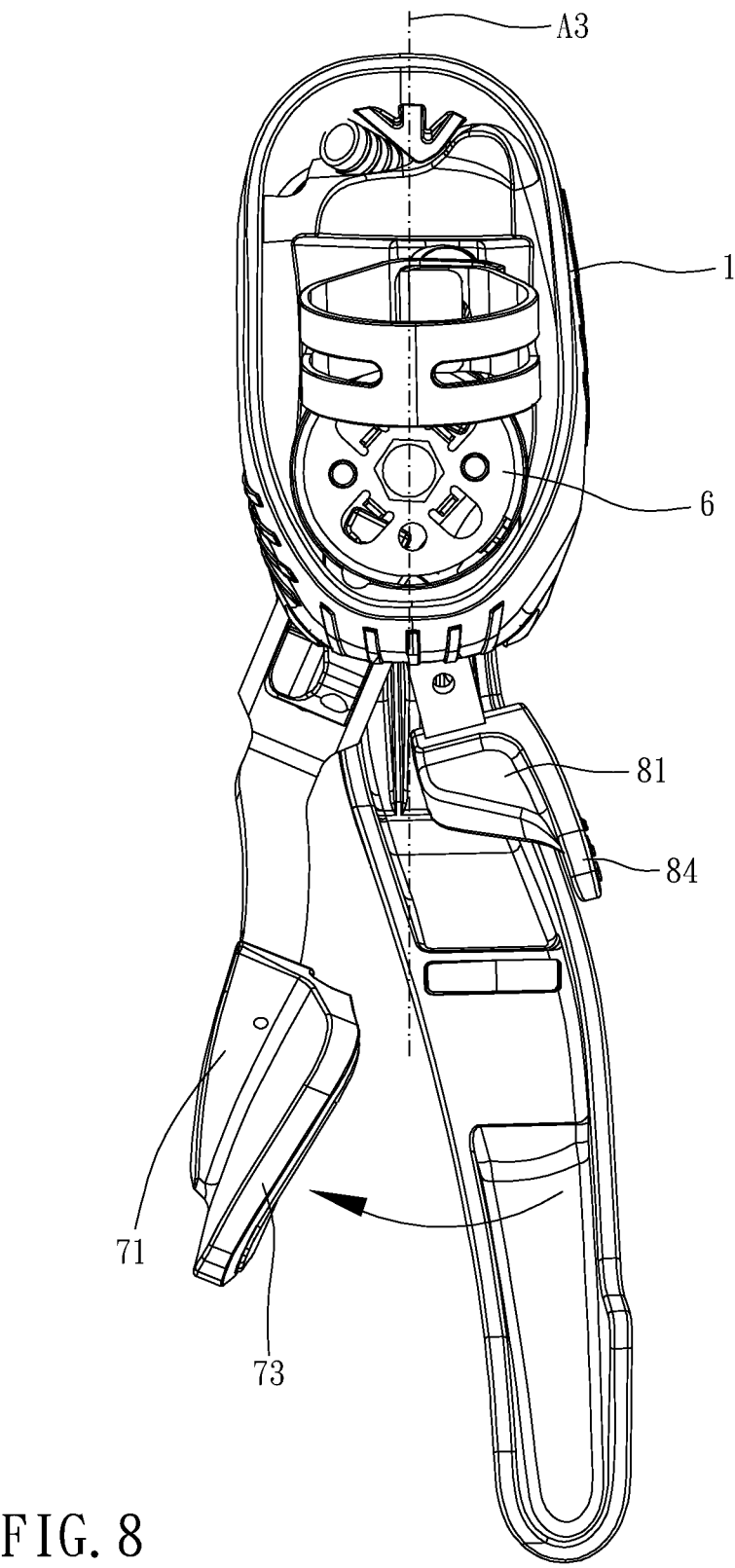
Figure 9:
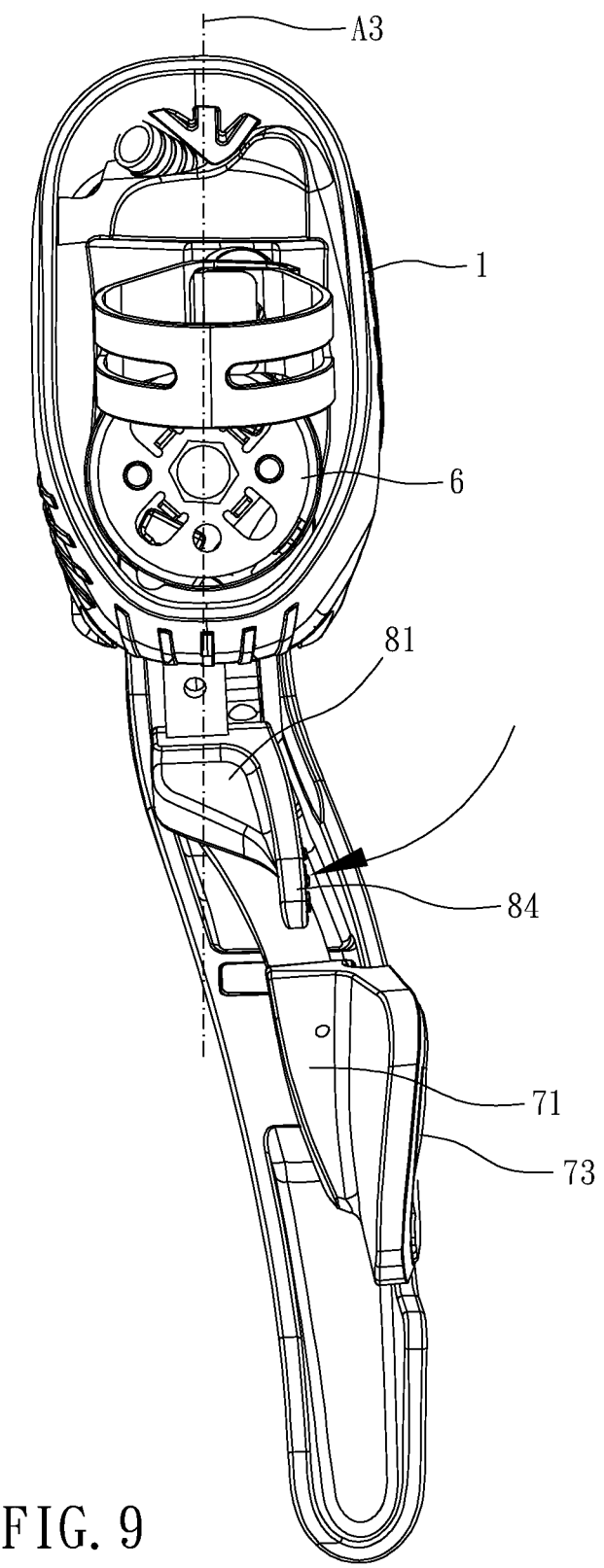

As shown in FIGS. 7 to 9, when the first actuating surface 73 and the second actuating surface 84 are not actuated, the first actuating surface 73 and the second actuating surface 84 are located at a side of the reference plane A3 remote from the bicycle. When the first operation assembly 7 is actuated, the first actuating surface 73 is moved toward the reference plane A3. When the second operation assembly 8 is actuated, the second actuating surface 84 is moved toward the reference plane A3. When the first actuating surface 73 is moved toward the reference plane A3, the second actuating surface 84 is not moved with the first actuating surface 73 so that the second actuating surface 84 is free of interference with the first actuating surface 73 for smooth gear shifting. The second actuating surface 84 is located between the second rotational axis A2 and the first actuating surface 73. The first actuating surface 73 and the second actuating surface 84 are located at the side of the reference plane A3 remote from the bicycle so that an operator can trigger one of the first actuating surface 73 and the second actuating surface 84 in a direction toward the bicycle by fingers, which is easy to use. The first actuating surface 73 and the second actuating surface 84 can be actuated individually and be free of interference with each other so as to provide smooth gear shifting.

Figure 2:
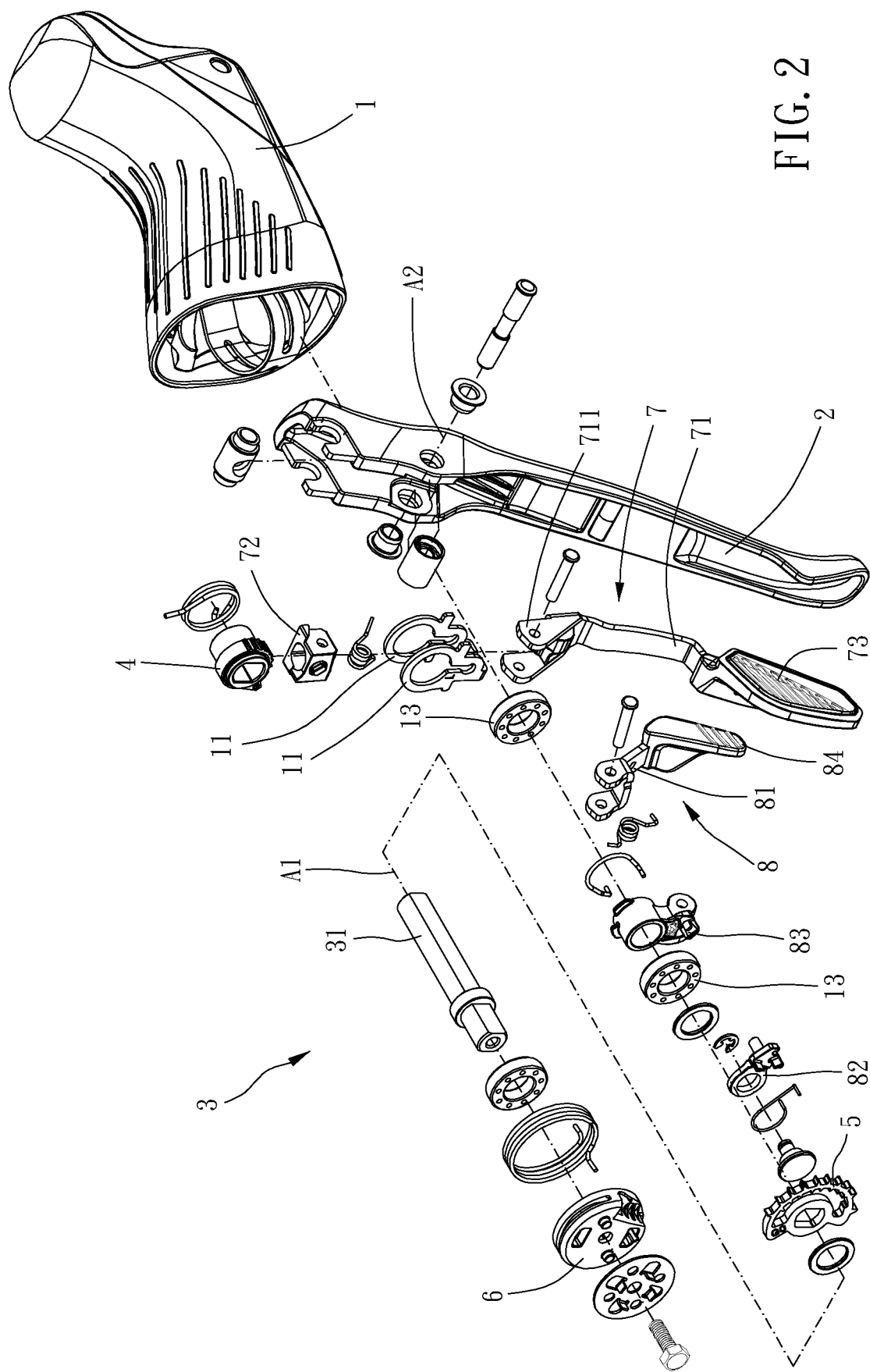
FIG. 2 is a breakdown drawing of a preferable embodiment of the present invention.
Figures 3, 4:
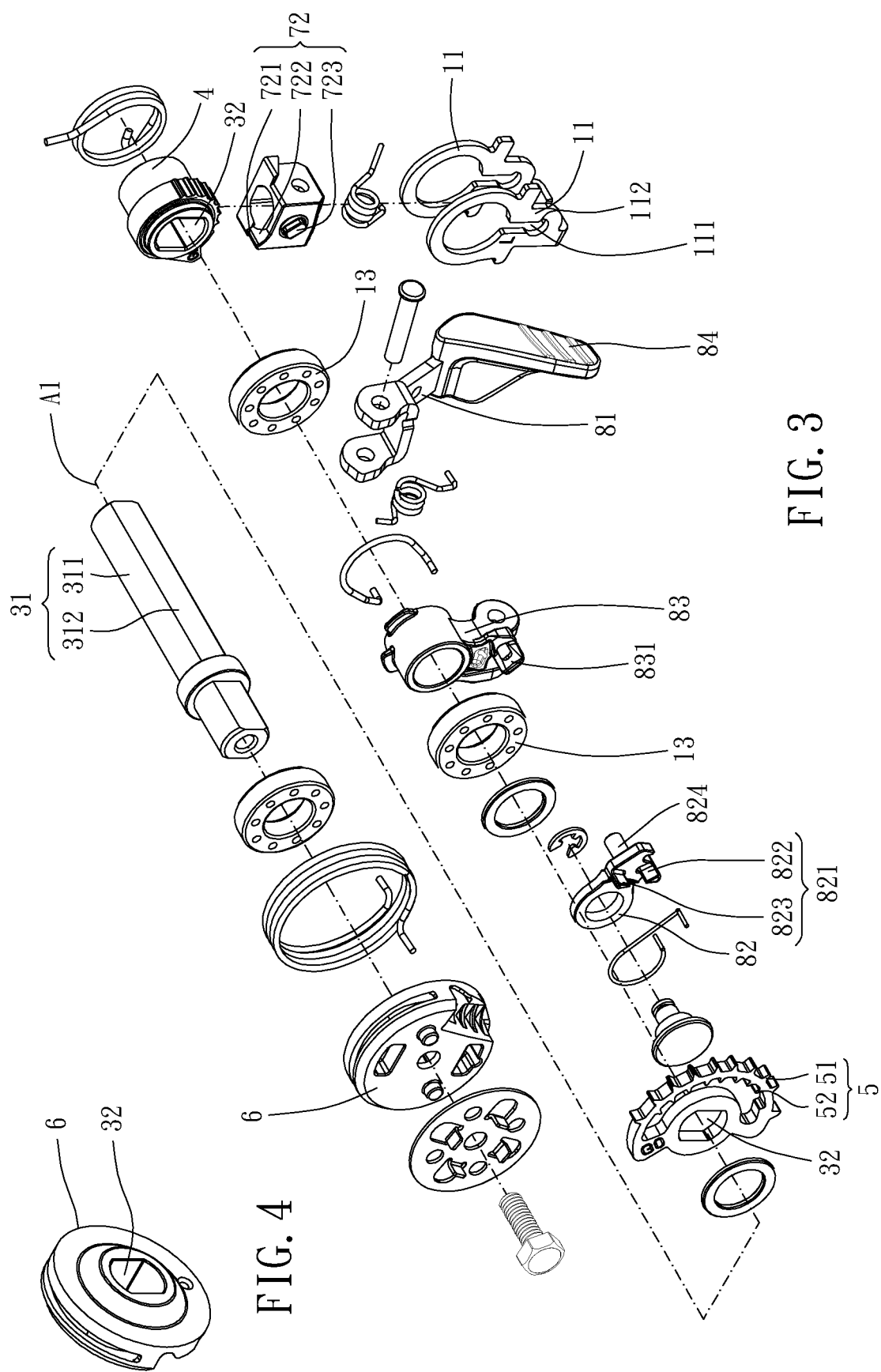
FIG. 3 is a partial breakdown drawing of a preferable embodiment of the present invention.
FIG. 4 is a stereogram of a wire reel according to a preferable embodiment of the present invention.
Figure 5:
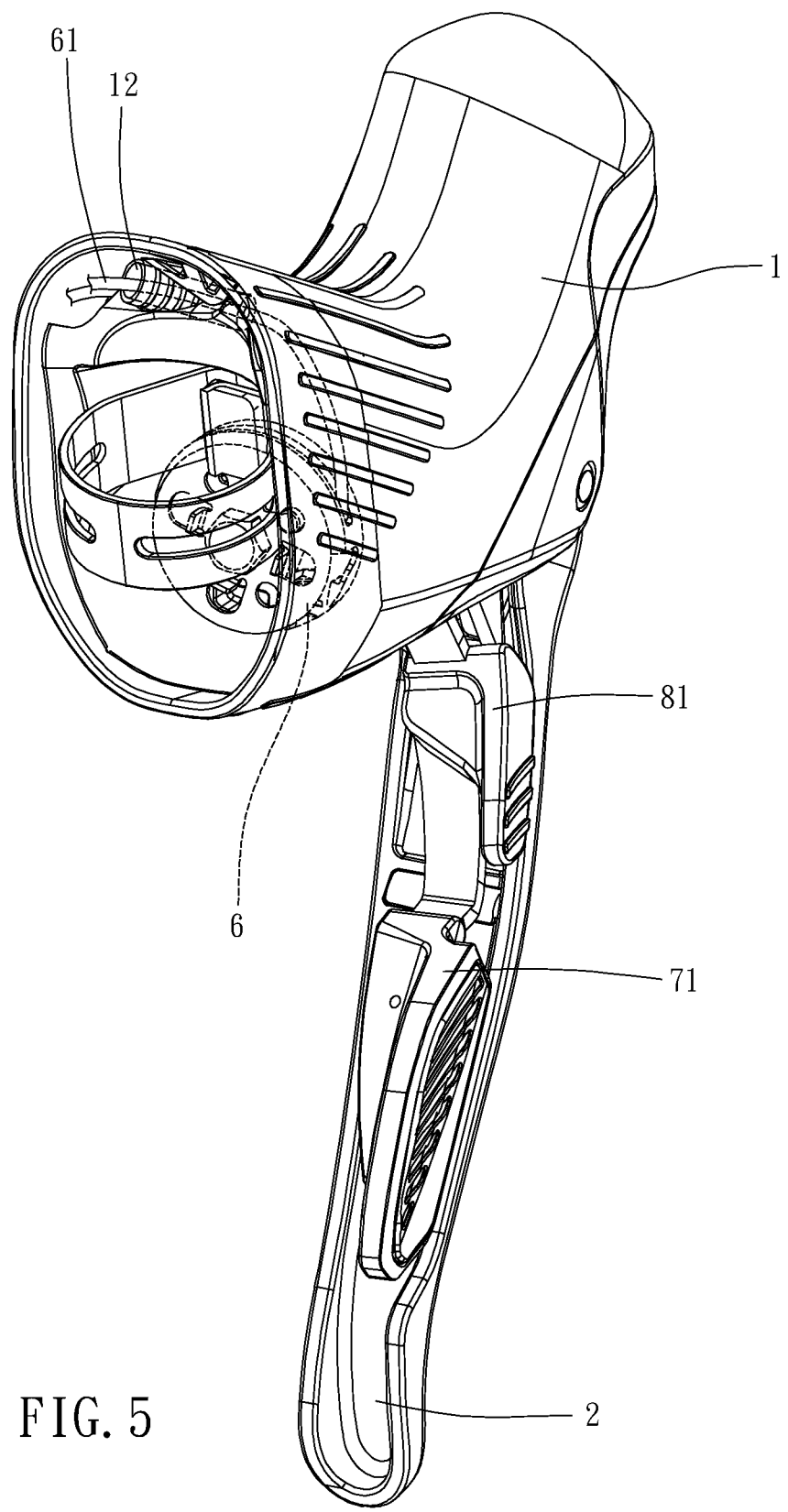
FIG. 5 is another stereogram of a preferable embodiment of the present invention.
Figure 6:
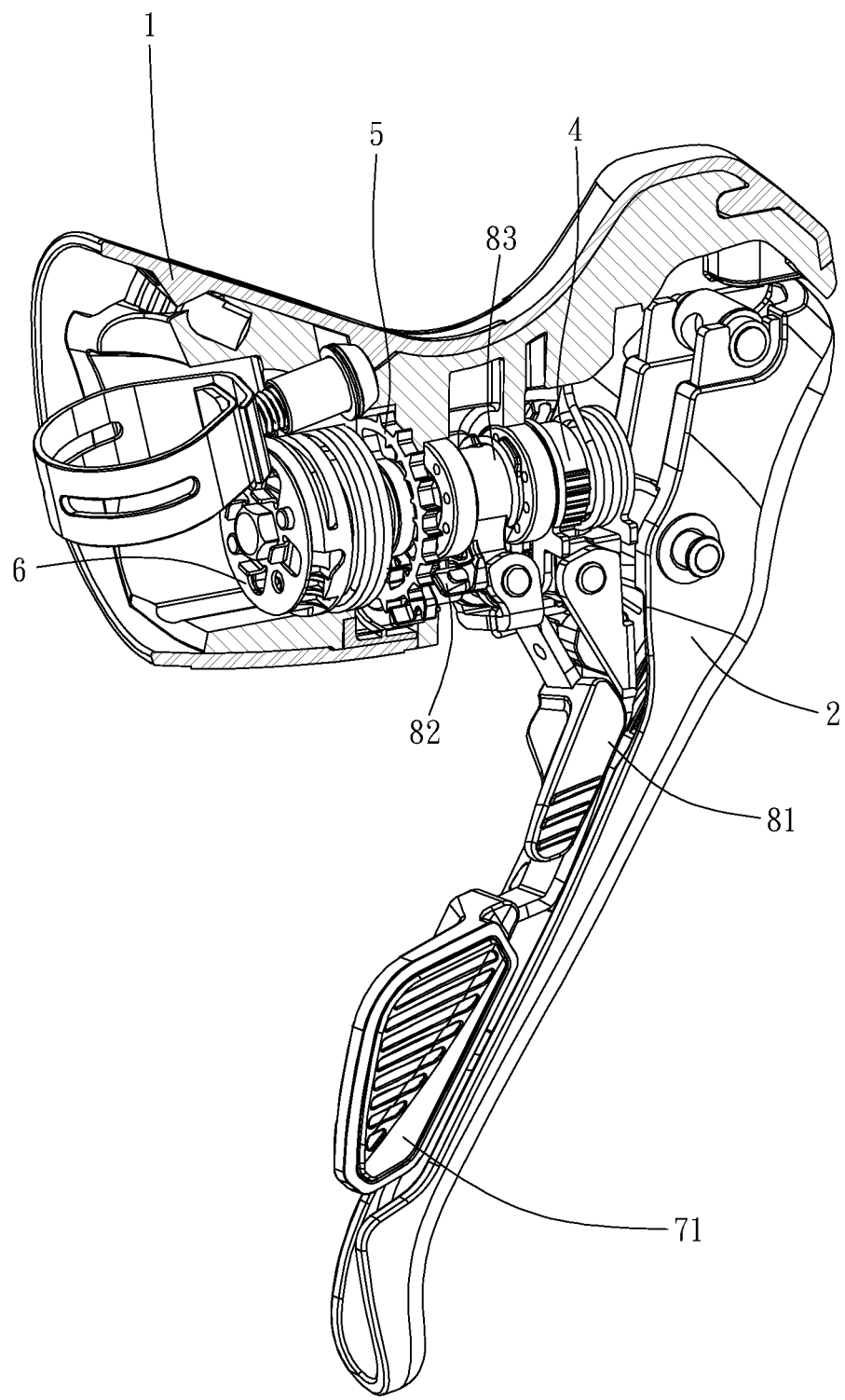
FIG. 6 is a partial cross sectional view of a preferable embodiment of the present invention.
Figure 14:
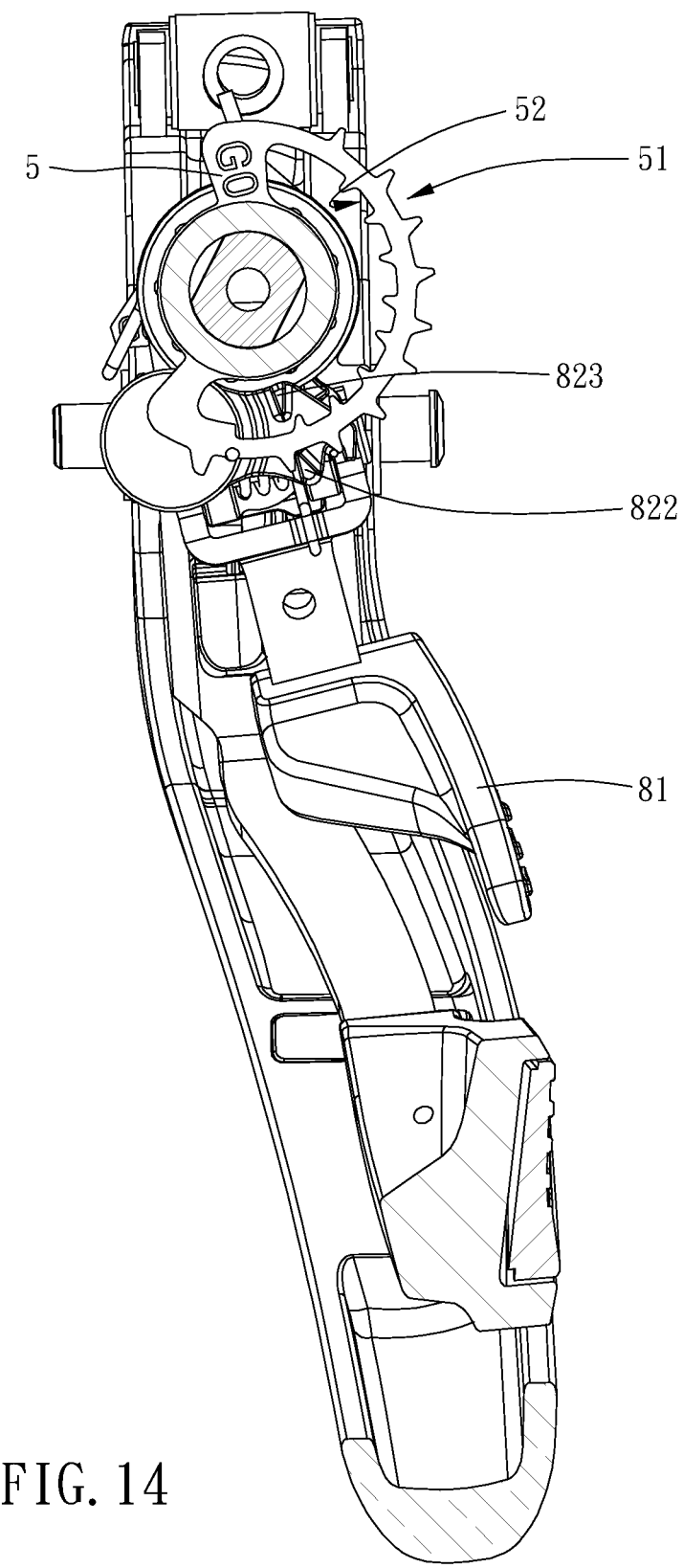
FIGS. 14-16 are cross sectional views showing operation of a second operation assembly according to a preferable embodiment of the present invention.
Figure 15:
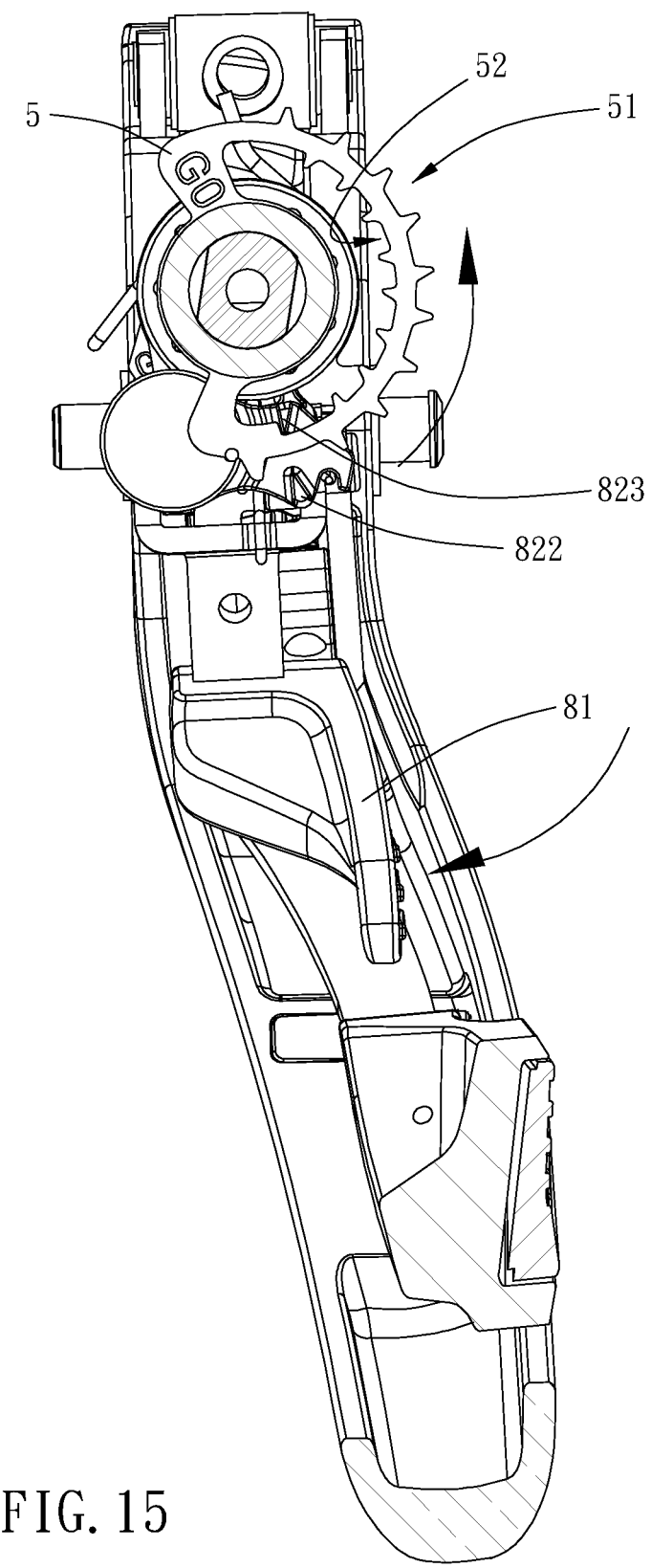
Figure 16:
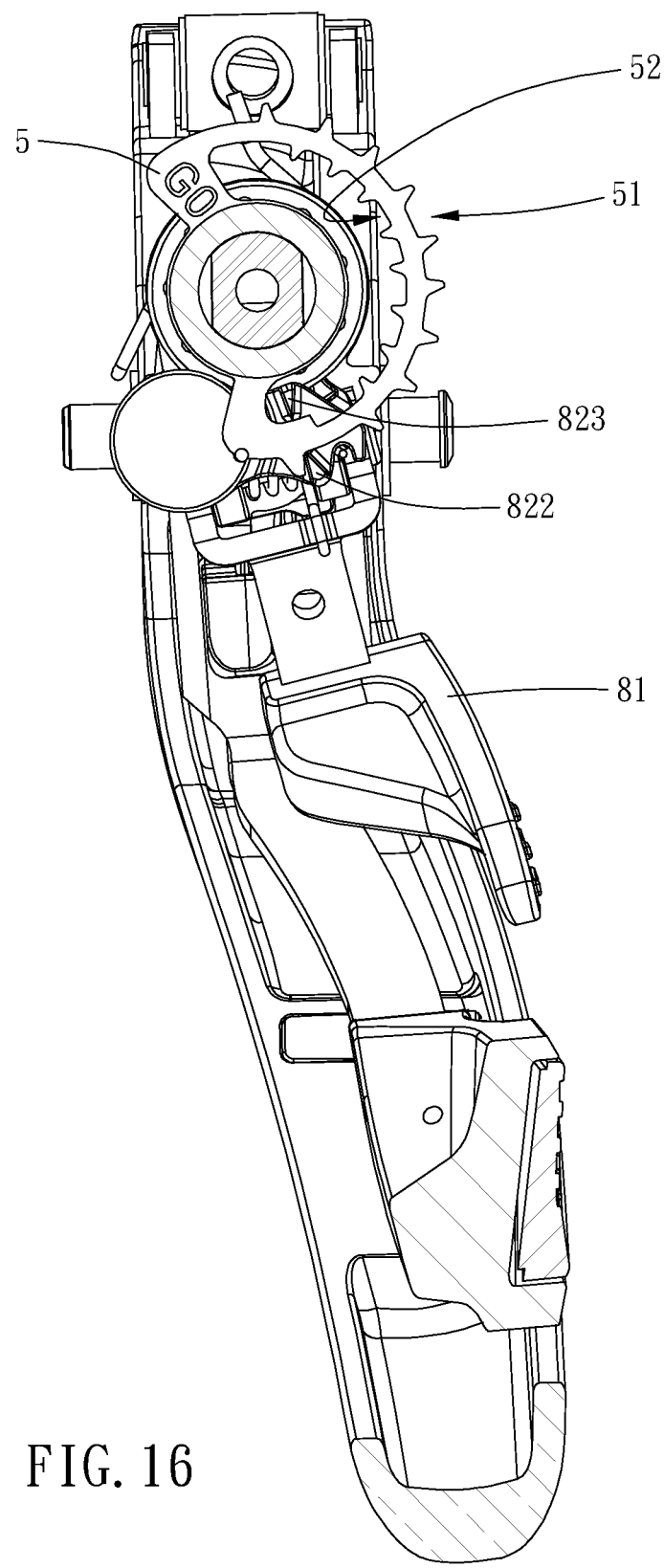

Specifically, as shown in FIGS. 14 to 16, the derailleur structure 3 further includes a second toothed disc 5, and the second toothed disc 5 is co-movably sleeved with the mandrel 31. The second operation assembly 8 includes a second engaging member 82 (as shown in FIGS. 2 and 3). When the first operation assembly 7 is actuated, the second toothed disc 5 is disengageable from the second engaging member 82 and rotated in a first direction to drive the wire reel 6 to pull the shift cable 61, and the second toothed disc 5 is non-rotatably engaged with the second engaging member 82 in a second direction reverse to the first direction. When the second operation assembly 8 is actuated and the first operation assembly 7 is not actuated, the second engaging member 82 is disengaged from the second toothed disc 5 and the wire reel 6 is rotated reversely (the wire reel 6 is rotated counterclockwise in this embodiment).

Moreover, the second operation assembly 8 further includes a second switching member 83 and a second lever 81. The second switching member 83 is rotatably disposed within the housing 1 about the first rotational axis A1, and the second lever 81 is rotatably disposed on the second switching member 83 about a direction parallel to the second rotational axis A2. The second actuating surface 84 is disposed on the second lever 81, and the second lever 81 and the second switching member 83 are co-rotatable with each other about the first rotational axis A1. The second engaging member 82 has a projection 824 protruding toward the second switching member 83. When the second lever 81 is actuated, a blocking portion 831 of the second switching member 83 is abutted against the projection 824 to drive the second engaging member 82 to swing.

Preferably, the second engaging member 82 is rotatably disposed within the housing 1 about the first rotational axis A1. The second engaging member 82 has the second engaging portion 821, and the second engaging portion 821 includes a second restriction member 822 and a third restriction member 823. The second toothed disc 5 includes an external toothed portion 51 and an internal toothed portion 52, and the external toothed portion 51 and the internal toothed portion 52 are located between the second restriction member 822 and the third restriction member 823. When the second operation assembly 8 is not actuated, the second restriction member 822 is releasably engaged with the external toothed portion 51 so that the second toothed disc 5 is rotatable in the first direction to pull the shift cable 61. When the second operation assembly 8 is actuated, the second restriction member 822 is disengaged from the external toothed portion 51, and the third restriction member 823 is engaged with the internal toothed portion 52 when the second toothed disc 5 is rotated in the second direction. Therefore, the bicycle operating device allows only one speed change when the second operation assembly 8 is actuated, which prevents a chain from falling off sprockets of the bicycle.

Furthermore, the derailleur structure 3 further includes a first toothed disc 4, and the first toothed disc 4 is co-movably sleeved with the mandrel 31. The first operation assembly 7 includes a first engaging member 72, and the first engaging member 72 is rotatably disposed on the housing 1 about the first rotational axis A1. When the first operation assembly 7 is actuated, the first operation assembly 7 drives the first engaging member 72 to be engaged with the first toothed disc 4 and drives the wire reel 6 to pull the shift cable 61 (the wire reel 6 is rotated clockwise in this embodiment). When the first operation assembly 7 is released, the first engaging member 72 is disengaged from the first toothed disc 4.

The mandrel 31 is a non-circular column, the first toothed disc 4, the second toothed disc 5 and the wire reel 6 respectively have an assembling hole 32 which is non-circular disposed therethrough, and the mandrel 31 penetrates through said assembling holes 32. The second toothed disc 5 is located between the first toothed disc 4 and the wire reel 6, which allows the components described above to be co-rotatable with one another.

An end of the housing 1 remote from the brake lever 2 in the first rotational axis A1 has a through hole 12. The shift cable 61 protrudes out of the housing 1 through the through hole 12 so as to be free of interference with a brake cable connected with the brake lever 2, which allows the bicycle operating device to accurately control gear shifting.

Figure 10:
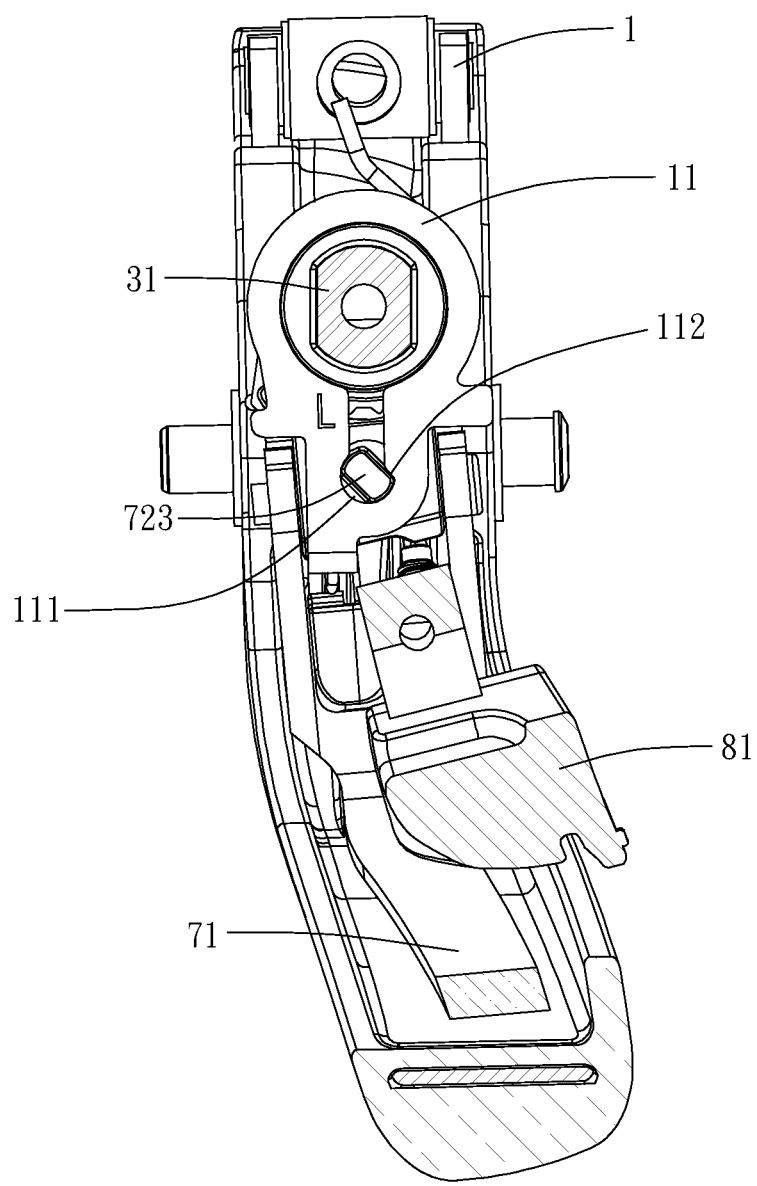
FIGS. 10-13 are cross sectional views showing operation of a first operation assembly according to a preferable embodiment of the present invention.
Figure 11:
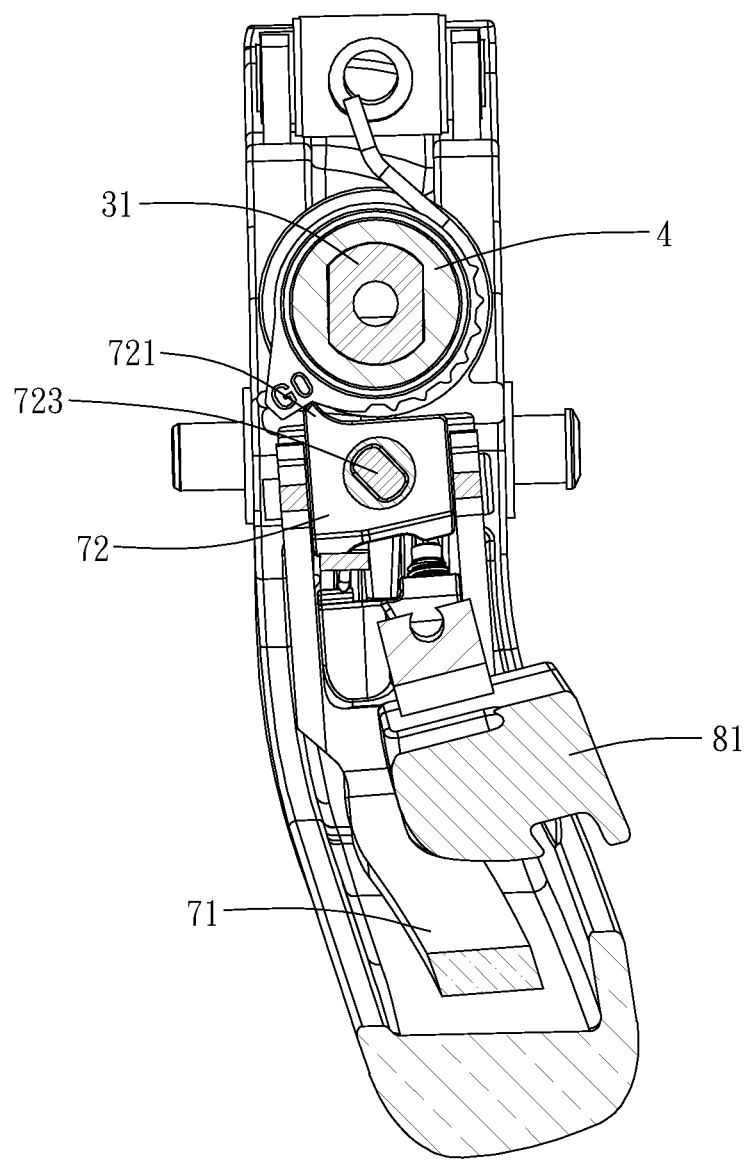
Figure 12:
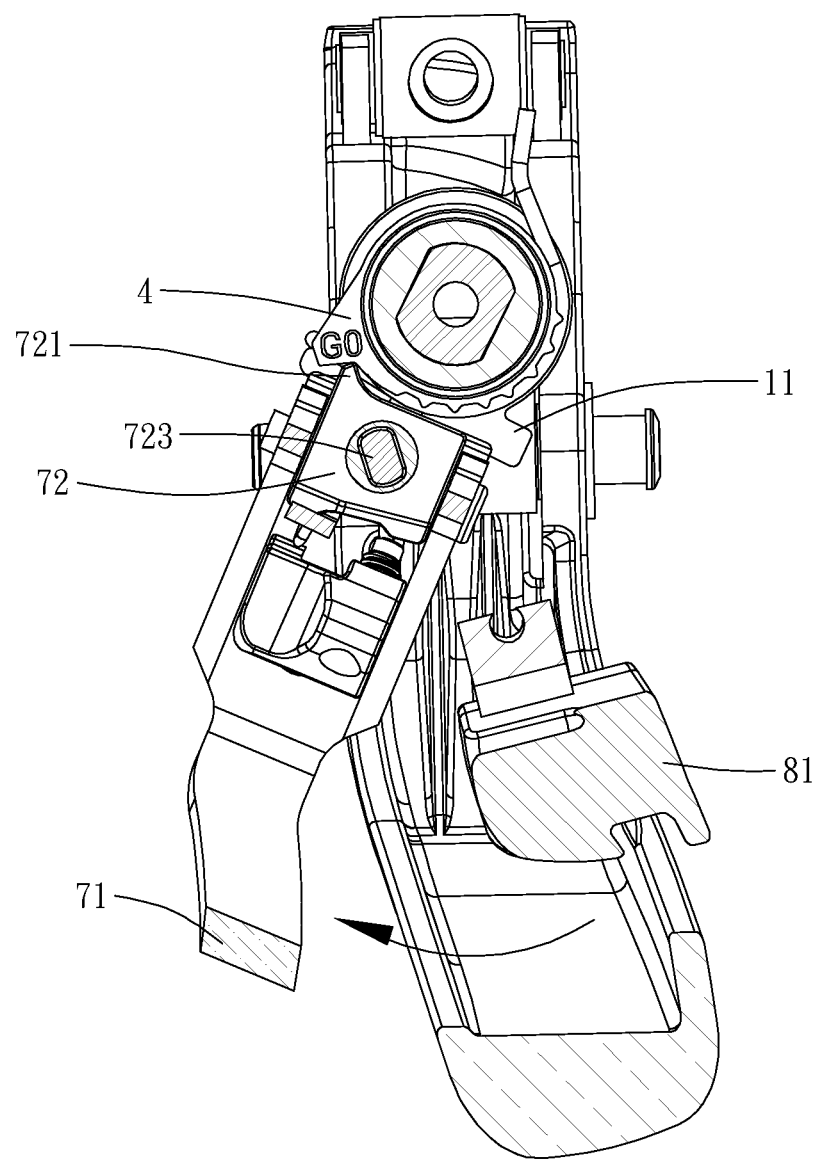
Figure 13:
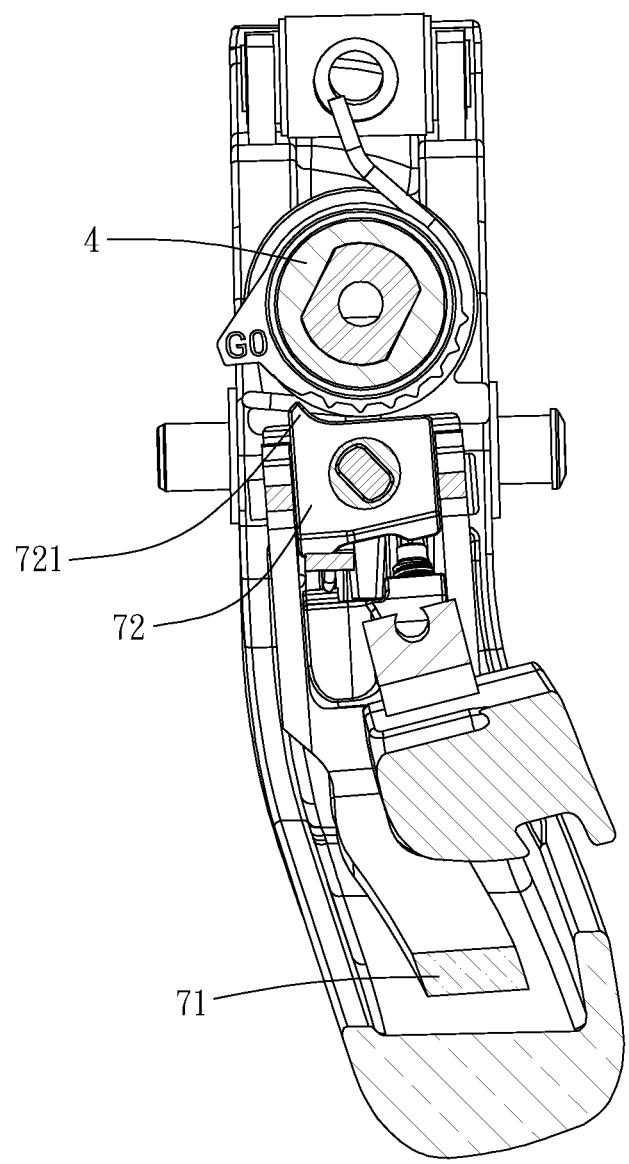

The bicycle operating device of the present invention further includes at least one first switching member 11, and each of the at least one first switching member 11 is rotatably disposed on the housing 1 about the first rotational axis A1. The first operation assembly 7 includes a first lever 71, and the first lever 71 is rotatably disposed on the first switching member 11 about a direction parallel to the second rotational axis A2. The first actuating surface 73 is disposed on the first lever 71, and each of the at least one first switching member 11 has a restriction hole 111. At least one side of the first engaging member 72 in the first rotational axis A1 has a protruding block 723 disposed thereon. In this embodiment, two opposite sides of the first engaging member 72 respectively have one said protruding block 723 which is rotatably disposed within one of the at least one restriction hole 111. Each of the at least one restriction hole 111 has a blocking edge 112, and each of said protruding blocks 723 is releasably blocked with one said blocking edge 112. Therefore, when the first lever 71 is actuated, the first engaging member 72 is rotated relative to the at least one first switching member 11 (as shown in FIGS. 10 and 11); and when the first engaging member 72 is abutted against the first toothed disc 4, the first lever 71 drives the first switching member 11 to rotate so that the first engaging member 72 can drives the first toothed disc 4 to rotate to upshift (as shown in FIGS. 11 and 12). When the first lever 71 is released, the first engaging member 72 is disengaged from the first toothed disc 4 (as shown in FIG. 13).

In this embodiment, the bicycle operating device includes two said first switching members 11, and the first lever 71 includes two ear pieces 711. The two ear pieces 711 extend between the two said first switching members 11 and are rotatably connected with the first engaging member 72. The first engaging member 72 includes a first engaging portion 721, and the first engaging portion 721 has a first restriction member 722. When the first lever 71 is actuated, the first restriction member 722 is engaged with the first toothed disc 4. Therefore, the first lever 71 and the second lever 81 can be swung individually, and the first lever 71 and the second lever 81 can be actuated alternatively to upshift or downshift rapidly, which provides good shifting maneuverability. Since the first lever 71 is rotatably disposed on the first switching member 11 about a direction parallel to the second rotational axis A2 and the second lever 81 is rotatably disposed on the second switching member 83 about a direction parallel to the second rotational axis A2, the brake lever 2 can drive the first lever 71 and the second lever 81 to swing when being swung about the second rotational axis A2, which avoids interference with one another.

Preferably, the mandrel 31 includes two arcuate surfaces 311 and two cutting surfaces 312 arranged alternatively, and the second switching member 83 and the two said first switching members 11 are sleeved to the mandrel 31 and contact the two arcuate surfaces 311 so that the second switching member 83 and the two first switching members 11 are rotatable relative to the mandrel 31. In this embodiment, the bicycle operating device further includes two bearings 13, and the two bearings 13 are sleeved to the mandrel 31. One of the two bearings 13 is abutted against and between the second toothed disc 5 and the second switching member 83, and the other of the two bearings 13 is abutted against and between the first toothed disc 4 and the second switching member 83, which allows the second switching member 83 to be smoothly rotated relative to the first toothed disc 4 and the second toothed disc 5.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle operating device, including:
a housing, configured to be assembled to a handlebar of a bicycle;
a derailleur structure, disposed on the housing, including a wire reel and a mandrel, the wire reel disposed on the mandrel, the wire reel configured for a shift cable to be wound thereon, an axial direction of the mandrel defining a first rotational axis, the wire reel being reversibly rotatable about the first rotational axis;
a brake lever, rotatably disposed on the housing, the brake lever being swingable about a second rotational axis, a plane vertical to the second rotational axis and passing through a center point of the wire reel being defined as a reference plane;
a first operation assembly, disposed on the housing, being reversibly rotatable relative to the housing to drive the wire reel to rotate and pull the shift cable, the first operation assembly having a first actuating surface disposed thereon; and
a second operation assembly, disposed on the housing, being reversibly rotatable relative to the housing to drive the wire reel to rotate reversely and release the shift cable, the second operation assembly having a second actuating surface disposed thereon;
wherein when the first actuating surface and the second actuating surface are not actuated, the first actuating surface and the second actuating surface are located at a side of the reference plane remote from the bicycle;
wherein when the first operation assembly is actuated, the first actuating surface is moved toward the reference plane; when the second operation assembly is actuated, the second actuating surface is moved toward the reference plane;
wherein when the first actuating surface is moved toward the reference plane, the second actuating surface is not moved with the first actuating surface;
wherein the second actuating surface is located between the second rotational axis and the first actuating surface.

2. The bicycle operating device of claim 1, wherein the wire reel is co-movably sleeved with the mandrel.

3. The bicycle operating device of claim 1, wherein the derailleur structure further includes a first toothed disc and a second toothed disc, and the first toothed disc and the second toothed disc are co-movably sleeved with the mandrel.

4. The bicycle operating device of claim 3, wherein the first operation assembly includes a first engaging member, and the second operation assembly includes a second engaging member; when the first operation assembly is actuated, the second toothed disc is disengageable from the second engaging member and rotated in a first direction to drive the wire reel to pull the shift cable, and the second toothed disc is non-rotatably engaged with the second engaging member in a second direction reverse to the first direction; when the second operation assembly is actuated and the first operation assembly is not actuated, the second engaging member is disengaged from the second toothed disc and the wire reel is rotated reversely.

5. The bicycle operating device of claim 4, further including at least one first switching member, wherein each of the at least one first switching member is rotatably disposed on the housing about the first rotational axis, the first operation assembly further includes a first lever, the first actuating surface is disposed on the first lever; the second operation assembly further includes a second switching member and a second lever, the second switching member is rotatably disposed within the housing about the first rotational axis, the second lever is rotatably disposed on the second switching member about a direction parallel to the second rotational axis, the second actuating surface is disposed on the second lever, the second lever and the second switching member are co-rotatable with each other about the first rotational axis, the second engaging member has a projection protruding toward the second switching member; and when the second lever is actuated, a blocking portion of the second switching member is abutted against the projection to drive the second engaging member to swing.

6. The bicycle operating device of claim 5, wherein the second engaging member is rotatably disposed within the housing about the first rotational axis, the second engaging member has a second engaging portion, the second engaging portion includes a second restriction member and a third restriction member, the second toothed disc includes an external toothed portion and an internal toothed portion, the external toothed portion and the internal toothed portion are located between the second restriction member and the third restriction member; when the second operation assembly is not actuated, the second restriction member is releasably engaged with the external toothed portion so that the second toothed disc is rotatable in the first direction to pull the shift cable; when the second operation assembly is actuated, the second restriction member is disengaged from the external toothed portion, and the third restriction member is engaged with the internal toothed portion when the second toothed disc is rotated in the second direction.

7. The bicycle operating device of claim 6, wherein the wire reel is co-movably sleeved with the mandrel; the first engaging member is rotatably disposed on the housing about the first rotational axis; when the first operation assembly is actuated, the first operation assembly drives the first engaging member to be engaged with the first toothed disc and drives the wire reel to pull the shift cable; and when the first operation assembly is released, the first engaging member is disengaged from the first toothed disc; each of the at least one first switching member has a restriction hole, at least one side of the first engaging member in the first rotational axis has a protruding block disposed thereon, each of said protruding block is rotatably disposed within one of the at least one restriction hole, each of the at least one restriction hole has a blocking edge, each of said protruding block is releasably blocked with one said blocking edge; the bicycle operating device includes two said first switching members, the first lever includes two ear pieces, the two ear pieces extend between the two said first switching members and are rotatably connected with the first engaging member; the first engaging member includes a first engaging portion, the first engaging portion has a first restriction member; when the first lever is actuated, the first restriction member is engaged with the first toothed disc; the mandrel is a non-circular column, the first toothed disc, the second toothed disc and the wire reel respectively have an assembling hole which is non-circular disposed therethrough, the mandrel penetrates through said assembling holes, and the second toothed disc is located between the first toothed disc and the wire reel; an end of the housing remote from the brake lever in the first rotational axis has a through hole, and the shift cable protrudes out of the housing through the through hole; the mandrel includes two arcuate surfaces and two cutting surfaces arranged alternatively, the second switching member and the two said first switching members are sleeved to the mandrel and contact the two arcuate surfaces; the bicycle operating device further includes two bearings, the two bearings are sleeved to the mandrel, one of the two bearings is abutted against and between the second toothed disc and the second switching member, the other of the two bearings is abutted against and between the first toothed disc and the second switching member.

8. The bicycle operating device of claim 3, wherein the first operation assembly includes a first engaging member, the first engaging member is rotatably disposed on the housing about the first rotational axis; when the first operation assembly is actuated, the first operation assembly drives the first engaging member to be engaged with the first toothed disc and drives the wire reel to pull the shift cable; and when the first operation assembly is released, the first engaging member is disengaged from the first toothed disc.

9. The bicycle operating device of claim 8, wherein the mandrel is a non-circular column, the first toothed disc, the second toothed disc and the wire reel respectively have an assembling hole which is non-circular disposed therethrough, the mandrel penetrates through said assembling holes, and the second toothed disc is located between the first toothed disc and the wire reel.

10. The bicycle operating device of claim 1, wherein an end of the housing remote from the brake lever in the first rotational axis has a through hole, and the shift cable protrudes out of the housing through the through hole.

* * * * *